United States Patent
Baskaran

(10) Patent No.: US 9,118,660 B2
(45) Date of Patent: Aug. 25, 2015

(54) METHOD AND SYSTEM FOR PROVIDING ACCESS TO ENCRYPTED DATA FILES FOR MULTIPLE FEDERATED AUTHENTICATION PROVIDERS AND VERIFIED IDENTITIES

(71) Applicant: Prakash Baskaran, Ashburn, VA (US)

(72) Inventor: Prakash Baskaran, Ashburn, VA (US)

(73) Assignee: Prakash Baskaran, Ashbuurn ( * ) Notice: Subject to any disclaimer, the term of this patent is extended or adjusted under 35 U.S.C. 154(b) by 16 days.

(21) Appl. No.: 14/010,726

(22) Filed: Aug. 27, 2013

(65) Prior Publication Data

US 2015/0067802 A1 Mar. 5, 2015

(51) Int. Cl.
- G06F 7/04 (2006.01)
- G06F 15/16 (2006.01)
- G06F 17/30 (2006.01)
- H04L 29/06 (2006.01)
- G06F 21/31 (2013.01)

(52) U.S. Cl.
CPC .............. H04L 63/083 (2013.01); G06F 21/31 (2013.01); H04L 29/06755 (2013.01); H04L 63/102 (2013.01); H04L 63/0428 (2013.01)

(58) Field of Classification Search
CPC . G06F 21/31; H04L 29/06755; H04L 63/102; H04L 63/083; H04L 63/0428
USPC .............................................. 726/1, 7, 27–30
See application file for complete search history.

(56) References Cited

U.S. PATENT DOCUMENTS

| | | | |
|---|---|---|---|
| 2007/0130363 A1* | 6/2007 | Barros | 709/238 |
| 2008/0028453 A1* | 1/2008 | Nguyen et al. | 726/9 |
| 2010/0235649 A1* | 9/2010 | Jeffries et al. | 713/189 |
| 2013/0124229 A1* | 5/2013 | Cashman et al. | 705/4 |
| 2014/0068736 A1* | 3/2014 | Agerstam et al. | 726/7 |

* cited by examiner

*Primary Examiner* — David García Cervetti
*Assistant Examiner* — Amie C Lin
(74) *Attorney, Agent, or Firm* — Barry Choobin; Patent360 LLC

(57) ABSTRACT

The embodiments herein disclose a method and system for providing access to an encrypted data file by separating the concerns of Authentication, Identity Resolution and Authorization from Encryption thereby allowing for multiple federated authentication providers and verified identities. The method comprises of creating an encrypted data file, embedding a file usage policy to the data file, sharing the encrypted data file with an identity of an intended content recipient and an allowed authentication provider specified in the file usage policy, activating a client application installed in a user device to open the encrypted data file, fetching and updating the data file usage policy from an application server, prompting the user to authenticate with the allowed authentication provider, authenticating the user with a specified authentication provider, verifying if the authenticated user is allowed to open the data file, opening the data file on successful verification and enforcing the file usage policy.

13 Claims, 7 Drawing Sheets

METHOD AND SYSTEM FOR PROVIDING ACCESS TO ENCRYPTED DATA FILES FOR MULTIPLE FEDERATED AUTHENTICATION PROVIDERS AND VERIFIED IDENTITIES

BACKGROUND

1. Technical Field

The embodiments herein generally relate to file sharing systems and methods and particularly relate an identity management method and system for managing and confirming one or more user identities for data sharing. The embodiments herein more particularly relate to a federated identity resolution management method and system for providing access to encrypted data files.

2. Description of the Related Art

Data sharing is the practice of making data available for others to reuse the data. Now a days data sharing among the people or among organizations is unavoidable to make the business, for scholarly research, entertainment and many other purposes.

The security of shared data has always been a difficult task. To protect data, one type of security procedure involves encrypting the data, so that even if the data falls into the wrong hands, it cannot be read without a key. Many application level programs provide some form of such encryption. Subsequently, the files maintained in the shared directory may be encrypted.

With proliferation of AKM based encryption that decouples Encryption from Authentication, we can envisage an end user with many encrypted files associated with many application servers. A file encapsulates information of the server that it is associated with and a client can use the information to communicate with a specific server. However for a recipient of an encrypted file, it would become difficult to keep track of the file sources and to use different authentication credentials for different files, given the fact that a recipient may be known to different senders b different identities.

Therefore there is a need for a method and system which provides for access to encrypted data files to users with different identities. Further there is a need for a federated identity resolution and management system which works in conjunction with an AKM infrastructure.

The abovementioned shortcomings, disadvantages and problems are addressed herein and which will be understood by reading and studying the following specification.

OBJECTS OF THE EMBODIMENTS

The primary object of the embodiments herein is to provide a method and system for enabling a user to access an encrypted data file using any of an allowed authentication mechanism and a verified identity.

Another object of the embodiments herein is to provide a method and system which verifies the identity of the recipient of the data file before providing access for the data file.

Another object of the embodiments herein is to provide a method and system which allow a recipient to independently group all the associated identities and verify the identities.

Another object of the embodiments herein is to provide a method and system which protects the credentials of a recipient.

Another object of the embodiments herein is to provide a method and system which enables a sender to decide the allowed authentication mechanism of the recipient.

Another object of the embodiments herein is to provide a method and system which allow a user to manage one or more identities associated with the user under an aggregate identity.

These and other objects and advantages of the embodiment herein will become readily apparent from the following summary and the detailed description taken in conjunction with the accompanying drawings.

SUMMARY

The various embodiments herein disclose a method for providing access to an encrypted data file. The method herein separates concerns of authentication, identity resolution and authorization from encryption thereby allowing for a plurality of federated authentication providers and a plurality of verified identities. The method comprises steps of creating the encrypted data file, where the data file is created by at least one of a content owner, a content generation system or an application adapted for generating content; embedding a file usage policy to the data file, sharing the encrypted data file with at least one identity of an intended content recipient and an allowed authentication provider specified in the file usage policy, activating a client application installed in a user device to open the encrypted data file, fetching and updating the data file usage policy from an application server by a client application, prompting the user to authenticate with at least one of the allowed authentication provider, authenticating the user with a specified authentication provider, verifying if the authenticated user is allowed to open the data file in an identity resolution server, opening the data file on successful user verification and enforcing the file usage policy.

According to an embodiment herein, the authentication provider comprises at least one of a password authentication of the application server, an AD/LDAP authenticator defined on the application server, one or more OAuth based authentication providers on the internet, one or more device authenticators, authenticators based on biometric information and authenticators based on asymmetric keys.

According to an embodiment herein, verifying if the authenticated user is authorized to open the data file comprises at least one of the following steps comprising verifying if the identity of the authenticated user matches with the identity of the file owner, verifying if the user identity is present in a distribution list is associated with the data file, where the distribution list comprises of a list of user identities allowed to open the data file included as a part of the file usage policy, verifying if the user identity matches with an alternate identity of the user, verifying if the user identity is of a registered user on the identity resolution server and verifying if one of the verified identities is featured in the distribution list.

According to an embodiment herein, the identity resolution server allows for a decoupled identity management, where the decoupled identity management tables the user to independently group a plurality of identities and add the identities through a verification process specific to the identity type without an involvement of a content owner.

According to an embodiment herein, the identity resolution server is adapted to support the plurality of verifiable identities, where the verifiable identities comprises at least one of an email address, an Open-ID, OAuth principal, a device ID, an IMEI number, a retina scan and a finger print.

According to an embodiment herein, the method of providing access to an encrypted data file further comprises creating a user account with the identity resolution server and adding one or more verifiable user identities under the user account. Here the method of creating the user account with the identity resolution server comprises of providing a plurality of user credentials, verifying if the user account exists for the provided user credentials, creating a new user account if the user account does not exist and saving the user account on the identity resolution server.

According to an embodiment herein, adding one or more user identities under the user account comprises of providing one or more verification processes depending on the type of identity selected by the user.

According to an embodiment herein, the method further comprises terminating the addition of the user identity if verification fails. The addition of the user identity is terminated during at least one of an unsuccessful authentication of the user with an authentication provider, denying the authorization of access to the identity resolution server for required information, if the identity is associated with a different user account and if the identity is not verified and confirmed within a stipulated time in case of an email address.

According to an embodiment herein, the identity resolution server enables late binding of the identities and resolution of the identities at the time of content access thereby removing a need for knowing the plurality of identities of an intended content recipient.

According to an embodiment herein, the content owner stipulates the allowed authentication providers to authenticate the intended content recipient even when the recipients identities associated with the allowed authentication providers are not known.

According to an embodiment herein, the data file comprises embedded policies for controlling the data file usage based on at least one of time, location and a distribution list, where the distribution list specifies the identities of intended content recipients authorized to use the data file.

According to an embodiment herein, the intended content recipient in the distribution list is recognized by at least one of the identities comprising an email address, an OAuth principal, an IMEI number and a device id.

Embodiments herein further disclose a system for providing access to encrypted data files for a plurality of federated authentication providers and a plurality of verified identities. The system comprises a client application installed in a user device, one or more authentication providers and an identity resolution server. The client application is adapted for enabling the user to create an encrypted data file by a content owner, embed a file usage policy to the data file, share the encrypted data file with at least one identity of an intended content recipient and an allowed, authentication provider specified in the file usage policy, open the encrypted data file and fetch and update the data file usage policy from an application server. The identity resolution server is adapted to authenticate the user with at least one of the allowed authentication provider, authenticate the user with a specified authentication provider, verify if the authenticated user is allowed to open the data file, open the data file on successful verification and enforce the file usage policy.

According to an embodiment herein, an identity can be a name that is unique within a system which is assigned to a user interacting with or present in the system. The "name" can, for example, be a string, a number or an email identity associated with a user. The identity federation concerns associating different identities of the same user with one another. The identity federation enables, amongst other things, a user to perform a single login operation in order to log in to a number of separate applications, each having separate login arrangements.

The embodiments herein allows the users to maintain a plurality of user devices, a plurality of a user identities and so on, as the decryption methodology adapted herein is policy driven. This enables to provide access to the content when the information passes through the listed devices, or else the content access is denied. In another case, where the user is same but the identity of the user is changed. For example, if the user changes a job, the user identity at work ceases to exist. The embodiments herein enable the user to authenticate with any of the other mapped user identities.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the an from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein disclose a method for providing access to an encrypted data file. The method herein separates the concerns of authentication, identity resolution and authorization from encryption thereby allowing for a plurality of federated authentication providers and a plurality of verified identities. The method comprises steps of creating the encrypted data file by a content owner, embedding a file usage policy to the data file, sharing the encrypted data file with at least one identity of an intended content recipient and an allowed authentication provider specified in the file usage policy, activating a client application installed in a user device to open the encrypted data file, fetching and updating the data file usage policy from an application server by a client application, prompting the user to authenticate with at least one of the allowed authentication provider, authenticating the user with a specified authentication provider, verifying if the authenticated user is allowed to open the data file in an identity resolution server, opening the data file on successful user verification and enforcing the file usage policy.

Figure 1:
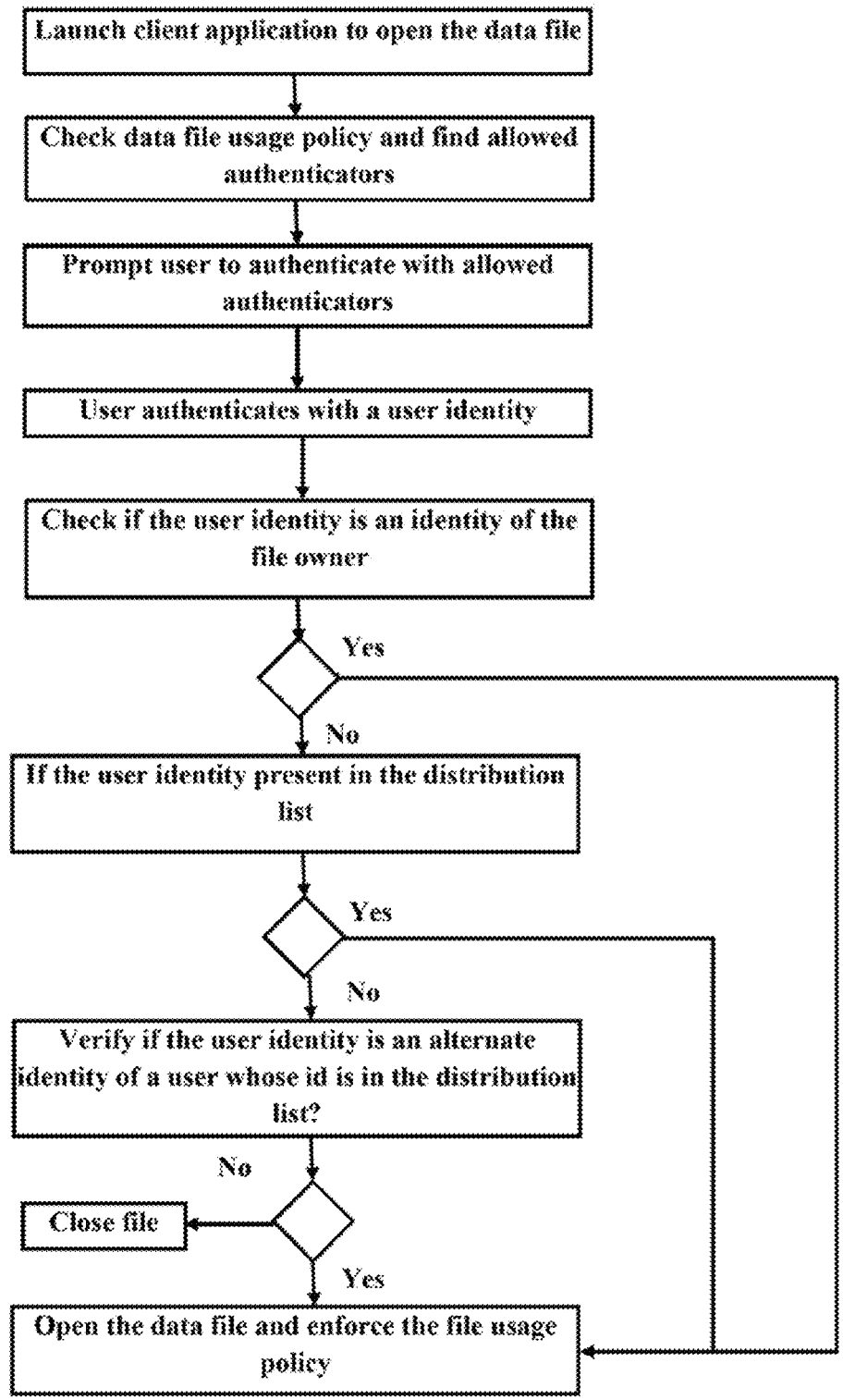
FIG. 1 is a prior an illustration of a method for authenticating and opening an encrypted data file.

FIG. 1 is a prior art illustration of a method for authenticating and opening an encrypted data file. The flow diagram illustrates the existing method of providing access to data files in the absence of an aggregated identity.

Figure 2A:
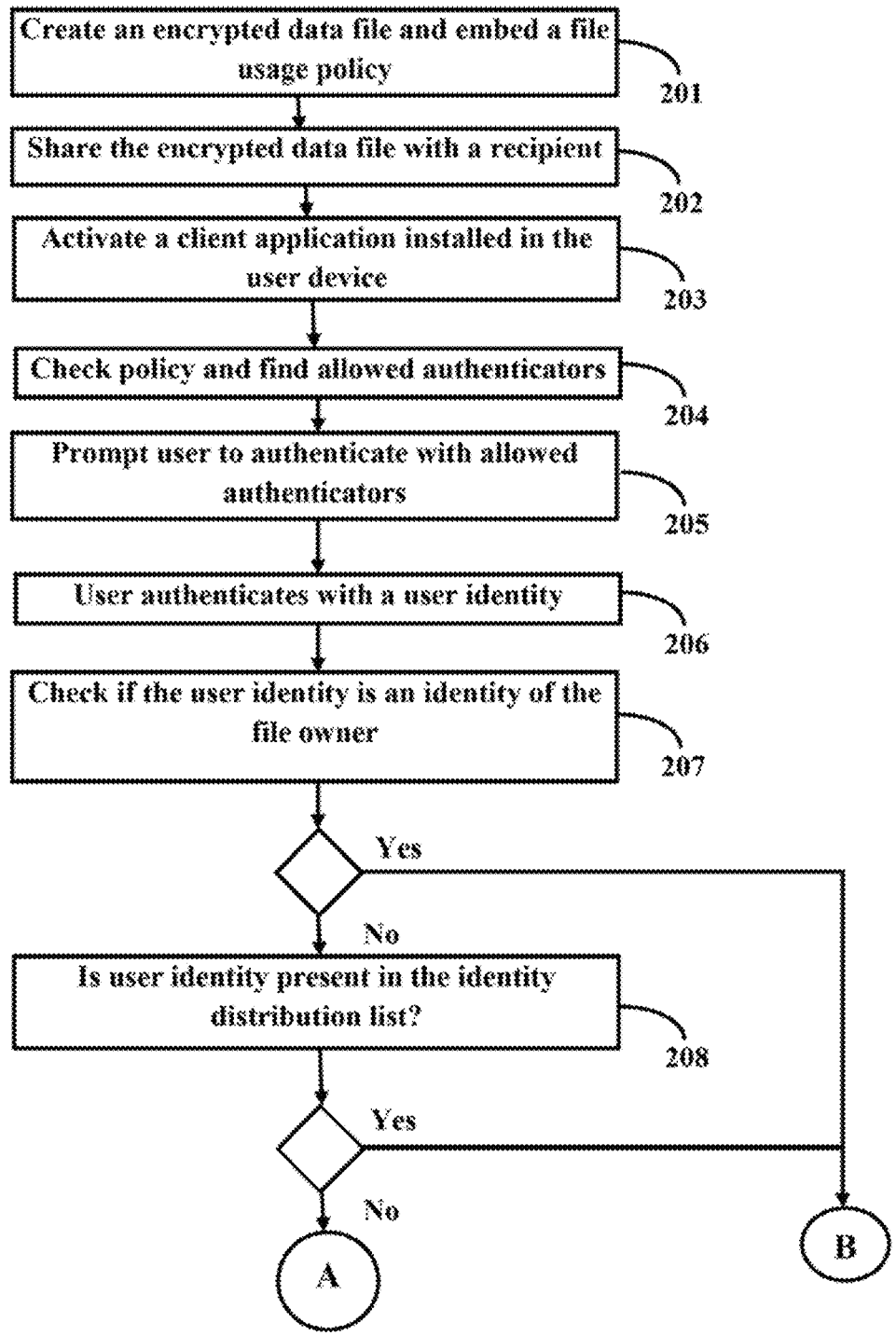
FIG. 2 is a flow diagram illustrating a method for providing access to encrypted data files for multiple federated authentication providers and verified identities according to an embodiment of the present disclosure.
Figure 2B:
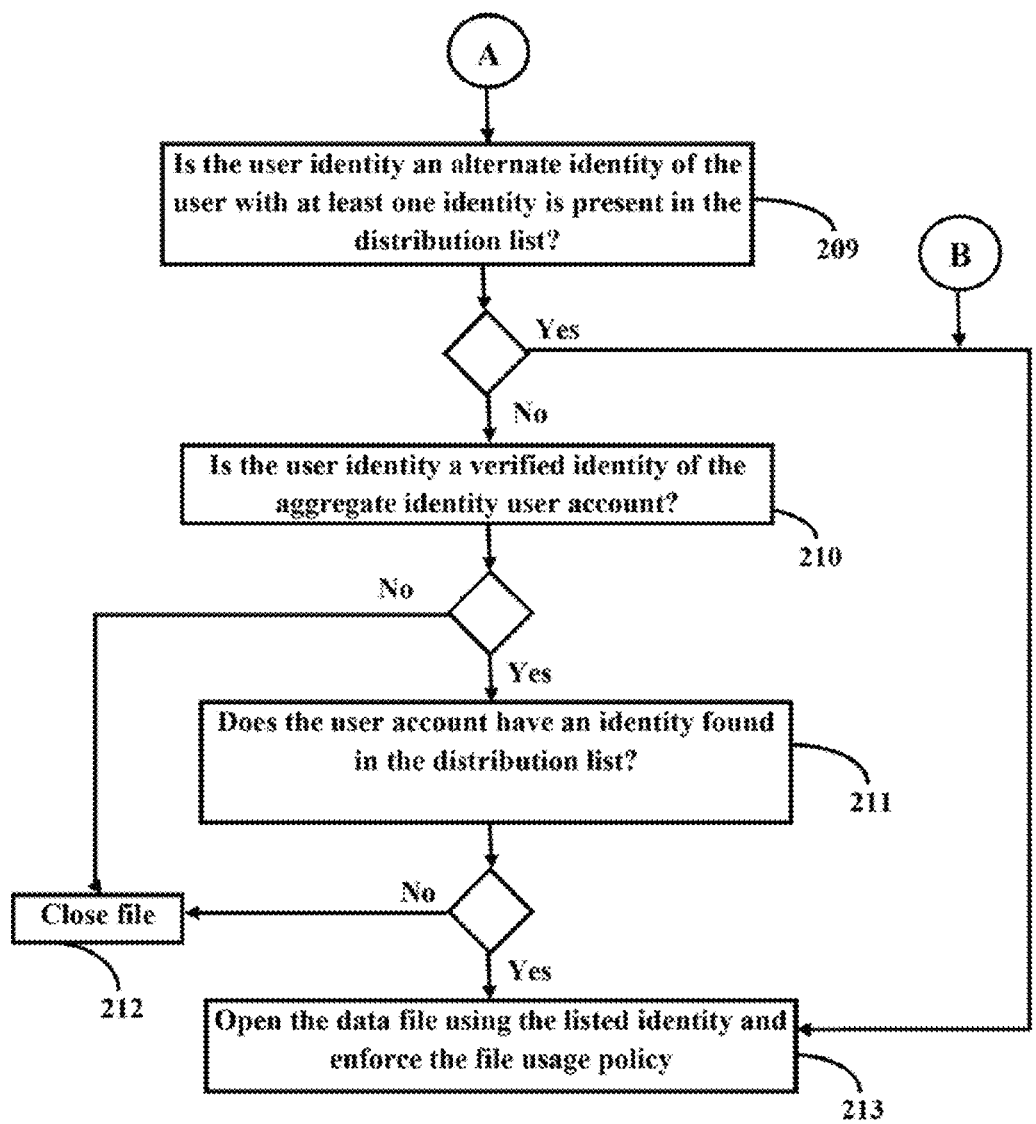

FIG. 2 is a flow diagram illustrating a method for providing access to encrypted data files for multiple federated authentication providers and verified identities according to an embodiment of the present disclosure. The user creates an encrypted data file and embeds a file usage policy to the data file at 201. The user herein is the content owner/sender of the data file. The user shares the encrypted data file with at least one identity of an intended content recipient and an allowed authentication provider specified in the file usage policy at 202. At 203, the user activates a client application installed in a user device to open the encrypted data file. The client application checks the data file usage policy embedded with the data file and finds the allowed authentication providers specified in the file usage policy at 204. The client application further prompts the user to authenticate with at least of the allowed authentication provider at 205. The user authenticates himself using a specified authentication provider at 206. The server further verifies if the specified authentication provider is an identity of the user at 207. If the user identity is verified, the user is allowed to open the data file and enforce the file usage policy at 213. If the user identity for opening the data file is not verified, the client application checks if the user identity is present in the identity distribution list at 208. If the user identity is present in the distribution list, the user is allowed to open the data file and enforce the file usage policy at 213. The distribution list herein comprises of a list of user identities allowed to open the data file included as a part of the file usage policy. If the user identity is not present in the distribution list, the client application checks if the user identity matches with an alternate identity of the user present in the distribution list or not at 209. The user is allowed to open the data file and enforce the file usage policy if the user identity matches with an alternate identity of the user at 213. If there is a mismatch, it is then checked to find if the user identity is a verified identity of the user account or not at 210. If the user identity is not a verified identity, then close the file at 212. If the user identity is a verified identity then perform a check to find if the user account has the identity found in the distribution list at 211. If yes, then enable the user/recipient to open the data file using the listed identity and enforce the file usage policy at 213. If not, then close the file at 212.

Figure 3:
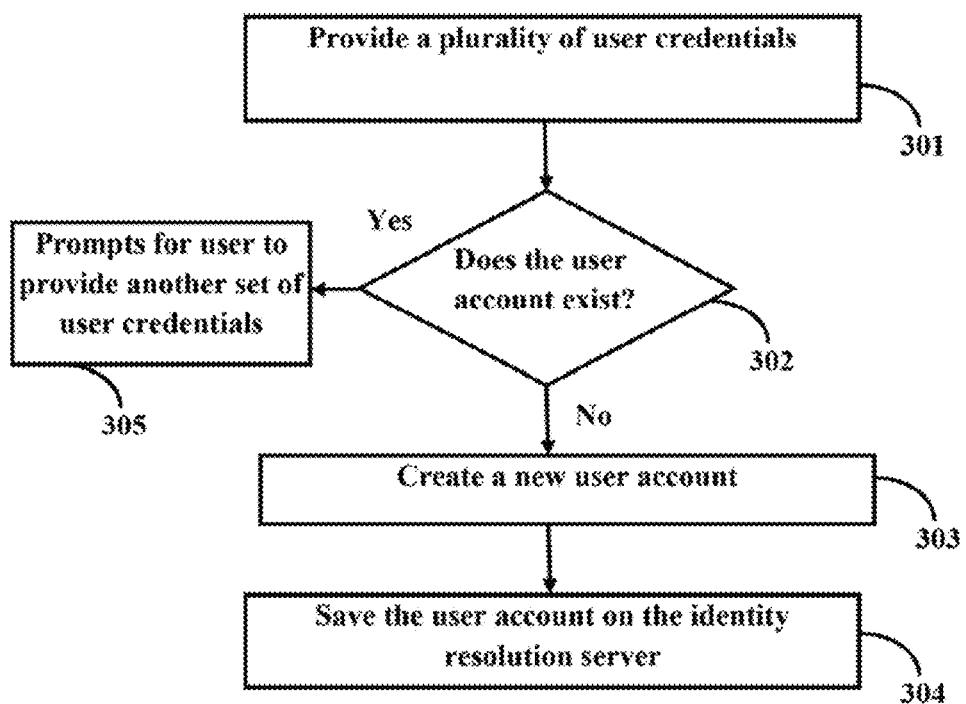
FIG. 3 is a flow diagram illustrating a method of creating all aggregate identity for a user, according to an embodiment of the present disclosure.

FIG. 3 is a flow diagram illustrating a method of creating an aggregate identity for a user, according to an embodiment of the present disclosure. The user provides a plurality of user credentials such as user name, password and the like at 301. The identity resolution server verifies if a user account exists for the provided user credentials or not at 302. If the user account does not exist, the identity resolution server creates a new user account at 303. Further the new user account is saved on the identity resolution server for further interactions at 304. If the user account already exits, the identity resolution server prompts for another set of user credentials to be provided for creating the user account at 305.

Figure 4:
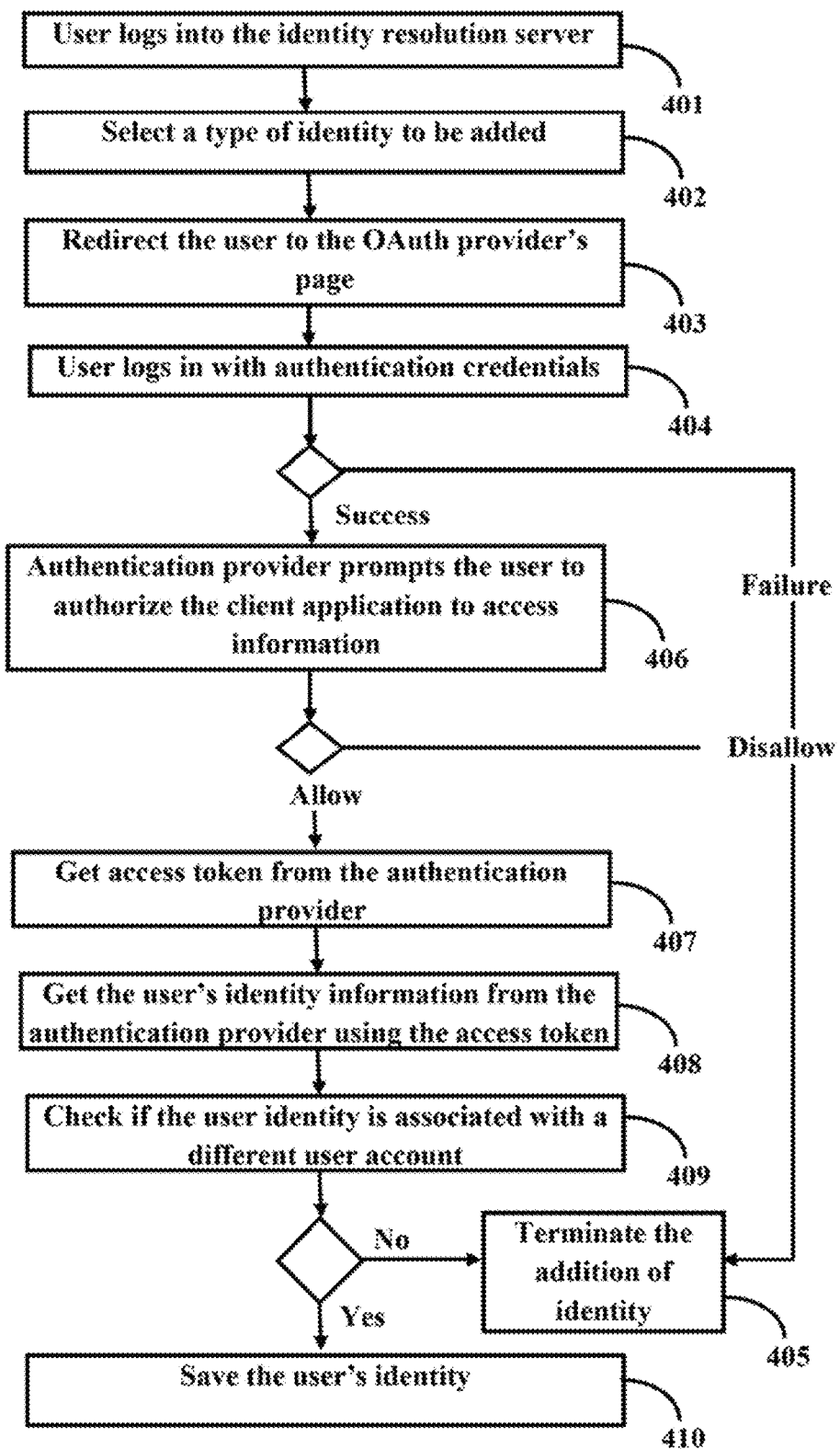
FIG. 4 is a flow diagram illustrating a method of adding an OAuth verified identity under an aggregate identity, according to an exemplary embodiment of the present disclosure.

FIG. 4 is a flow diagram illustrating a method of adding an OAuth verified identity under an aggregate identity, according to an exemplary embodiment of the present disclosure. The user logs into the identity resolution server at 401. On successful logging in, the user selects a type of identity to be added under the aggregate identity at 402. According to the example herein, the type of identity is an ° Audi verified identity. On selecting the OAuth verified identity, the server redirects the user to the OAuth provider's page at 403. At 404, the user logs in with the authentication credentials for verification. If the verification fads, the authentication provider terminates the addition of the user identity at 405. If the verification is successful, then the authentication provider prompts the user to authorize the client application to access information at 406. The client application obtains access token from the authentication provider if the user allow information access at 407. If the user disallows the access, the server terminates the identity addition at 405. Further the client application obtains the user's identity information from the authentication provider using the access token at 408. The client application further checks if the user identity is associated with a different account or not at 409. If the identity is not associated with any other user account, then save the user identity under the aggregate identity at 410. If the identity is associated with a different user account, the identity resolution server terminates the addition of the user identity at 405.

Figure 5:
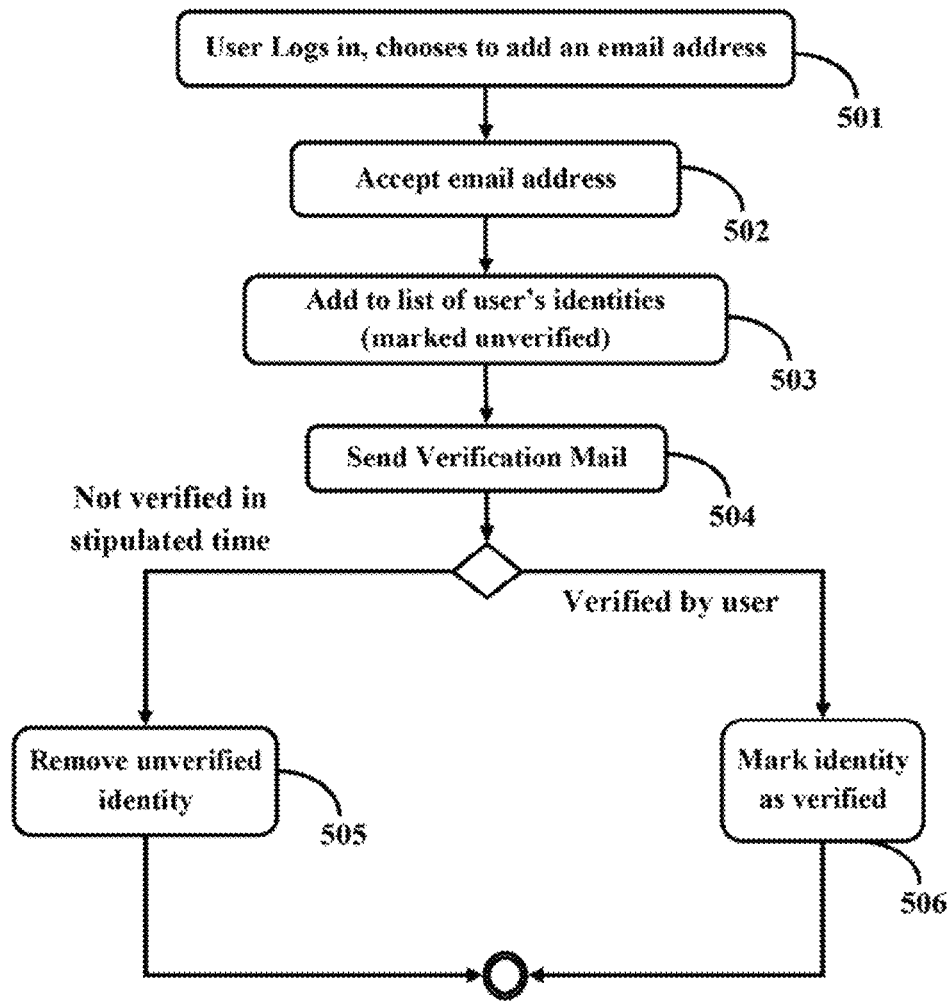
FIG. 5 is a flow diagram illustrating a method of adding an email address as a user identity under an aggregate identity, according to another exemplary embodiment of the present disclosure.

FIG. 5 is a flow diagram illustrating a method of adding an email address as a user identity under an aggregate identity, according to another exemplary embodiment of the present disclosure. The user logs into the identity resolution server with the pre-created user account credentials and select to add an additional email address as a verifiable user identity under the user account at 501. The user accepts the email address at 502 and adds the email address to the list of user's identities as an unverified, identity at 503. The identity resolution server sends a verification mail to the user to confirm the email address at 504. If the user does not verify the authenticity of the email address within a pre-defined time, the identity resolution server removes the unverified email address at 505. If the email address is verified by the user, the identity resolution server marks the email address as a verified identity of the user at 506.

Figure 6:
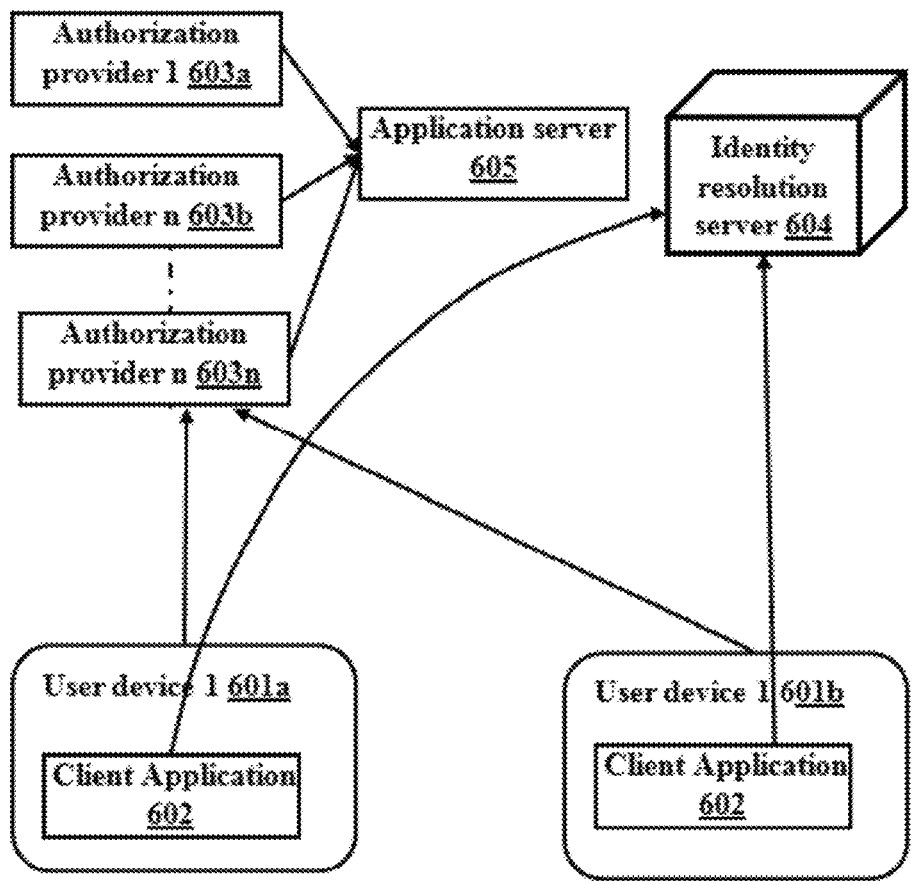
FIG. 6 is a block diagram illustrating a system for providing access to encrypted data files for multiple federated authentication providers and verified identities according to an embodiment of the present disclosure.

FIG. 6 is a block diagram illustrating a system for providing access to encrypted data files for multiple federated authentication providers and verified identities according, to an embodiment of the present disclosure. The system comprises a client application 602 installed in one or more user devices 601a-601b, one or more authentication providers 603a-603n and an identity resolution server 604.

The one or more user devices 601a-601b is at least one of a content provider device or a content recipient device. The authentication provider 603 is at least one of a password authentication of the application server 605, an authenticator defined on the application server 605 and one or more OAuth based authentication providers on internet. The identity resolution server 604 is adapted to support a plurality of verifiable identity types. The plurality of verifiable identity type comprises at least one of an email address, a user id-password pair, an Open-ID, OAuth principal, a device ID, an IMEI number, a personal identification number and a biometric identity.

The client application 602 installed in a user device 601a-601b enables the user to create an encrypted data file, embed a file usage policy to the data file, share the encrypted data file with at least one identity of an intended content recipient and an allowed authentication provider 603 specified it the file usage policy, permits the user to open the encrypted data file and fetch the data file usage policy from the application server 605.

According to an embodiment herein, the identity resolution server 604 is adapted to authenticate the user with at least one of the allowed authentication provider 603, authenticate the user with a specified authentication provider 603, verify if the authenticated user is allowed to open the data file, enable the user to open the data file on successful verification and enforce the file usage policy.

The identity resolution server 604 enables late binding of the identities and resolution of the identities at the time of content access by the user. This does not require a need for knowing the plurality of identities of an intended content recipient.

The identity resolution server 604 allows for decoupled identity management. The decoupled identity management enables the user to independently group a plurality of identities and add the identities through a verification process specific to the identity type without an involvement of a content owner.

The embodiments herein enable a recipient to open a file using an of the allowed authentication mechanisms and a verified identity. For example, if a recipient has two identities A@gmail.com and B@yahoo.com and a file has B@yahoo.com in the distribution list, then the recipient is able to open the file using A@gmail.com or B@yahoo.com if the authenticators, Google and Yahoo are permitted.

The embodiments herein functions in a way so as to protect the recipient's credentials where for the purpose of authentication and verification, the recipient provides his passwords directly to the actual authenticator and the system does not collect, transmit or store a user's passwords The embodiments herein preserve the ability of a sender to decide the authentication mechanism that recipients are allowed to use. E.g. the sender may want to only allow Google OAuth to be used for authentication. And in certain situations a sender may want a recipient to be authenticated only through a certificate issued to him/her instead of popular authentication mechanisms such as Google, Twitter or the like.

Although the embodiments herein are described with various specific embodiments, it will be obvious for a person skilled in the art to practice the embodiments herein with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A method for providing an intended content recipient with access to an encrypted data file, the method comprising the following steps:
creating the encrypted data file;
enabling said intended content recipient to create a plurality of identities, wherein each of the identities are mapped to respective authenticators;
creating an identity distribution list corresponding to the intended content recipient, said identity distribution list comprising the identities created by the intended content recipient and the corresponding authenticators, and storing said identity distribution list in an identity resolution server;
embedding a file usage policy with the encrypted data file, said file usage policy specifying at least one identity to be used by the intended content recipient to access the encrypted data file, said file usage policy further specifying at least one authenticator authorized to authenticate the intended content recipient;
transmitting the encrypted data file to the intended content recipient;
prompting the intended content recipient to authenticate himself by providing his identity;
authenticating the intended content recipient by determining whether the identity provided by the intended content recipient is equivalent to any of the identities specified in said file usage policy;
accessing the identity resolution server only in the event that the identity provided by the intended content recipient does not match any of the identities specified in said file usage policy, said step of accessing the identity resolution server further comprising the following steps:
determining whether the identity specified in the content usage policy is included in the identity distribution list corresponding to the intended content recipient;
extracting the identities corresponding to the intended content recipient from the identity distribution list, excluding the identity specified in the content usage policy, only in the event that the identity specified in the content usage policy is included in said identity distribution list;
determining whether the identity provided by the intended content recipient is identical to any of the extracted identities;
determining whether the authenticator corresponding to the identity provided by said intended content recipient is included in said identity distribution list;
authenticating the intended content recipient; and
enabling the intended content recipient to access the encrypted data file subsequent to successful authentication of the intended content recipient.

2. The method of claim 1, wherein the authentication provider comprises at least one of a password authentication of the application server, an Active Directory/Lightweight Directory Access Protocol (AD/LDAP) based authenticator defined on the application server, an Open Standard To Authentication (OAuth) based authentication provider, one or more device authenticators, authenticators based on biometric information and authenticators based on asymmetric keys.

3. The method of claim 1, wherein the identity resolution server is configured to support the plurality of verifiable identities, where the verifiable identities comprises at least one of an email address, Open Standard To Authentication (OAuth) principal, a device ID, an International Mobile Station Equipment Identity (IMEI) number, a retina scan and a finger print.

4. The method of claim 1, further comprises the following steps:
creating a user account with the identity resolution server; and
adding one or more verifiable user identities under the user account; wherein creating the user account with the identity resolution server comprises the following steps:
providing a plurality of user credentials;
verifying if the user account exists for the provided user credentials;
creating a new user account if the user account does not exist; and
saving the user account on the identity resolution server.

5. The method of claim 4, wherein adding one or more verifiable user identifies under the user account comprises of providing one or more verification processes depending on the type of identity selected by the user.

6. The method of claim 1, further comprising terminating the addition of the user identity if verification fails, wherein the addition of the user identity is terminated during at least one of:
   unsuccessful authentication of the user with an authentication provider,
   denying the authorization of access to the identity resolution server for required information;
   if the identity is associated with a different user account; and
   if the identity is not verified and confirmed within a stipulated time in case of an email address.

7. The method of claim 1, wherein the content owner stipulates the allowed authentication providers to authenticate the intended content recipient even when the recipients identities associated with the allowed authentication providers are not known.

8. The method of claim 1, wherein the data file comprises embedded policies for controlling the data file usage based on at least one of time, location and a content distribution list; wherein the content distribution list specifies the identities of intended content recipients authorized to access the encrypted data file.

9. The method of claim 1, wherein the intended content recipient in the content distribution ht is recognized by at least one of the identities comprising an email address, an OAuth principal, an IMEI number and a device id.

10. A computer-implemented system for providing an intended content recipient with access to an encrypted data file, said system comprising:
   a computer enabled device accessible to a content sender, said device configured to create the encrypted data file, said device further configured to embed a file usage policy with the encrypted data file, wherein said file usage policy specifies at least one identity to be used by the intended content recipient to access the encrypted data file, said file usage policy further specifying at least one authenticator authorized to authenticate the intended content recipient;
   an identity resolution server accessible to the content recipient, said identity resolution server cooperating with the device accessible to the content sender, said identity resolution server configured to:
      selectively create a plurality of identities corresponding to the intended content recipient, each of said identities mapped to respective authenticators;
      create an identity distribution list corresponding to the intended content recipient, said identity distribution list comprising the identities created by the intended content recipient and the corresponding authenticators;
      transmit the encrypted data file to the intended content recipient, and prompt the intended content recipient to authenticate himself by providing his identity;
      authenticate the intended content recipient by determining whether the identity provided by the intended content recipient is identical to any of the identities specified in said file usage policy embedded with the encrypted data file;
      determine, only in the event that the identity provided by the intended content recipient does not match any of the identities specified in said file usage policy, whether the identity specified in the content usage policy is included in the identity distribution list corresponding to the intended content recipient;
      extract the identities corresponding to the intended content recipient from the identity distribution list excluding the identity specified in the content usage policy, only in the event that the identity specified in the content usage policy is included in said identity distribution list;
      determine whether the identity provided by the intended content recipient is identical to any of the extracted identities;
      determine whether the authenticator corresponding to the identity provided by said intended content recipient is included in said identity distribution list;
      authenticate the intended content recipient; and
      enable the intended content recipient to access the encrypted data file subsequent to successful authentication of the intended content recipient.

11. The system of claim 10, wherein the authentication provider is at least one of an Active Directory/Lightweight Directory Access Protocol (AD/LDAP) based authenticator defined on the application server, password authentication of the application server, an authenticator defined, on the application server and one or more OAuth based authentication providers on internet.

12. The system of claim 10, wherein the identity resolution server is configured to support a plurality of verifiable identity types comprising at least one of an email address, a user id-password pair, Open Standard To Authentication (OAuth) principal, a device ID, an International Mobile Station Equipment Identity (IMEI) number, a personal identification number and a biometric identity.

13. The system as claimed in claim 10, wherein said identity resolution server is further configured to implicitly authenticate the intended content recipient by verifying the intended content recipient related information stored in the authentication provider, said identity resolution server still further configured to explicitly authenticate the intended content recipient by prompting the intended content recipient to provide at least one of a username-password pair, a digital signature and a personal security certificate.

\* \* \* \* \*